United States Patent [19]

Valeri et al.

[11] 4,222,865
[45] Sep. 16, 1980

[54] TROMMEL SCREEN UNIT

[75] Inventors: William J. Valeri, Pengilly; Daniel O. Burkes, Hibbing, both of Minn.

[73] Assignee: Irathane Systems Incorporated, Hibbing, Minn.

[21] Appl. No.: 12,880

[22] Filed: Feb. 16, 1979

[51] Int. Cl.² .......................... B07B 1/22; B07B 1/46
[52] U.S. Cl. .................................. 209/399; 209/407
[58] Field of Search ................................ 209/397–399, 209/404–405, 409, 414, 392–395, 406–408; 241/79.2, 79.3

[56] References Cited

U.S. PATENT DOCUMENTS

| | | | |
|---|---|---|---|
| 3,194,397 | 7/1965 | Taege | 209/398 |
| 3,319,786 | 5/1967 | Rudolf | 209/414 |
| 3,456,795 | 7/1969 | Svensson et al. | 209/399 |
| 3,811,570 | 5/1974 | Holding et al. | 209/399 |

Primary Examiner—Ralph J. Hill
Attorney, Agent, or Firm—Peterson, Palmatier, Sturm & Sjoquist, Ltd.

[57] ABSTRACT

The trommel screen unit includes a screen panel of polyurethane having embedded therein a plurality of longitudinal and transverse fiberglass rods. Marginal portions of the polyurethane panel overlie and are bonded to a rectangular steel frame, the sides of the frame having longitudinally spaced notches which receive therein the end portions of the transverse rod.

23 Claims, 14 Drawing Figures

TROMMEL SCREEN UNIT

BACKGROUND OF THE INVENTION

1. Field of the Invention

This invention relates generally to trommels comprised of a number of individual screen units which collectively form a revolving, drum-like sieve, and pertains more particularly to the construction of a screen unit, the various screen units being structurally identical.

2. Description of the Prior Art

Trommels, of course, are old and well known, comprising a number of individual screen units. Each unit contains a screen in the form of a panel having holes therein of a size and spacing appropriate for the material to be processed.

Some prior art units have utilized an elastomeric panel as the screen, such as polyurethane. However, owing to the resiliency of polyurethane panels, such panels flex outwardly during the rotation of the trommel, and because of this shortcoming some reinforcement has been required in the past. More specifically, the reinforcement has usually involved the employment of steel hardward cloth held against the panel's outer surface so as to resist the outward bulging of the elastomeric panel.

However, the effective anchoring of the hardware cloth along its marginal edges has posed a problem. Even when firmly anchored at its edges, the center of the hardward cloth, which is unsupported, has a tendency to bulge. Also, the hardware cloth, being composed of a grid of criss-crossing wires, is subject to wear caused by the abrasive character of the particulate material being sifted, and therefore must be replaced from time to time. Corrosive environments can also render the screen unit short-lived.

Irrespective of the cause, when hardward cloth must be replaced, it is time consuming and tedious to do so, requiring that the trommel be inactivated or shut down for a period sufficient to permit the change to be made. Also, hardware cloth, and other types of metal reinforcement, adds to the weight of the trommel. Still further, hardware cloth has a propensity for becoming blocked from small rocks, thereby reducing its effectiveness; here again, the removal of the rocks takes time.

SUMMARY OF THE INVENTION

Accordingly, the present invention has for a general object the provision of reinforcing means that is internal or within the elastomeric screen panel rather than external thereof. In this way abrasion and corrosion, both of which have been experienced with prior art constructions, are virtually eliminated. In this regard, an aim of the invention is to provide a longer lasting trommel screen unit than heretofore.

Another object of the invention is to provide a reinforcement for elastomeric screen panels that will be strong and lightweight. More specifically, the invention contemplates the employment of fiberglass rods contained completely within the polyurethane panel.

Yet another object of the invention is to provide a plurality of fiberglass rods within a trommel screen unit that will flex in a predetermined or controlled manner throughout their length without adversely affecting the bond between the polyurethane panel and the steel frame embedded within the panel.

A further object is to provide a trommel screen unit that, generally speaking, will be self-cleaning by virtue of the flexing that occurs as the trommel rotates.

Even though screen units constructed in accordance with the present invention require changing far less frequently than in the past, a very important object is to effect the replacement in considerably less time than heretofore. As an illustration, in the past the trommel's discharge chute has had to be completely drained. Still further, a considerable amount of time has also been needed in making entry to the inside of the trommel possible. With screen units constructed in accordance with the present invention, any given screen or plurality of screens can be removed without entering the trommel. All that the worker need do is to remove the cover to the discharge chute to gain access to clamps on the outside of the trommel. In this way, any screen unit can be removed from the outside of the trommel without ever going inside, as has been heretofore necessary. Consequently, screen units can now be changed on an unscheduled basis whenever it proves necessary to do so, and this is achieved without any significant loss of production time.

Still another object is to provide a screen unit that can be employed readily with different designs of trommels and without having to physically modify any of the trommel parts. In this regard, it is planned that my screen unit be releasably clamped in place and that the clamping be done from the outside of the trommel rather than from the inside.

Briefly, our invention envisages the use of a trommel screen unit employing a polyurethane panel which is bonded to a rectangular steel frame, making use of longitudinal and transverse fiberglass rods within the polyurethane material. The end portions of the transverse fiberglass rods are received in notches formed in the sides of the steel frame and are encased within the polyurethane, the polyurethane overlapping, and being bonded to, the sides and ends of the steel frame.

DESCRIPTION OF THE PREFERRED EMBODIMENT

Figure 1:
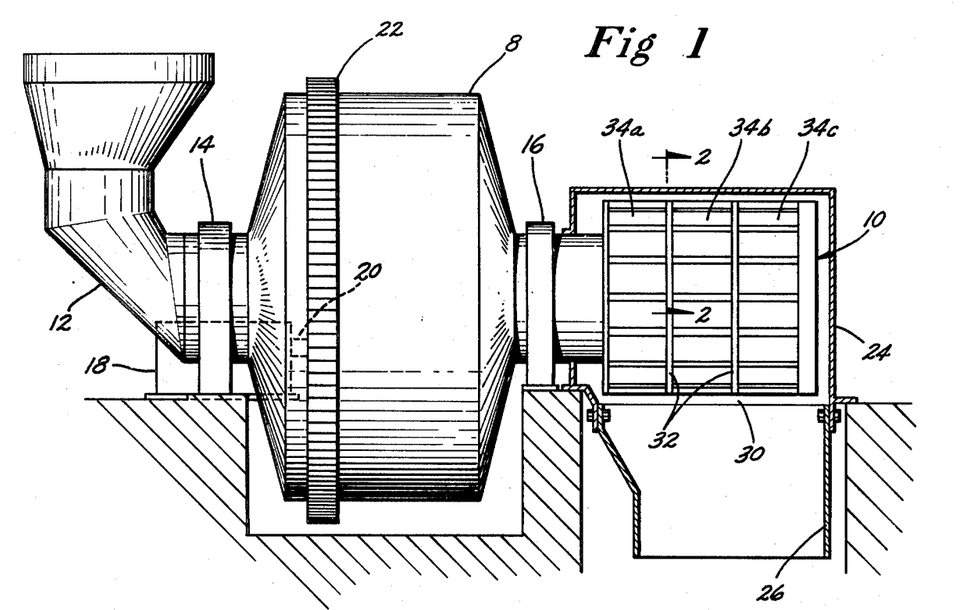
FIG. 1 is a side elevational view of a typical combined grinding mill and trommel.

In FIG. 1, a typical grinding mill 8 and trommel 10 have been rather diagrammatically depicted. The material to be ground is introduced into the mill 10 via a feed chute 12. The mill 8 and trommel 10 are journaled for rotation in bearings 14 and 16. By means of a motor 18 and a pinion (not visible) on the motor's shaft 20, the pinion engaged with a ring gear 22 encircling the mill 8, the mill 8 and trommel 10 are rotated in unison about a horizontal axis.

The trommel 10 extends into a casing 24 having a discharge chute 26 therebeneath. In this way the material fed into the mill 8 is first ground therein and then sifted in the trommel 10. The screened material is gravitationally discharged downwardly through the chute 26, whereas any oversized material is conveyed back through the center of the trommel 10 to the mill 8 for further grinding.

Figure 3:
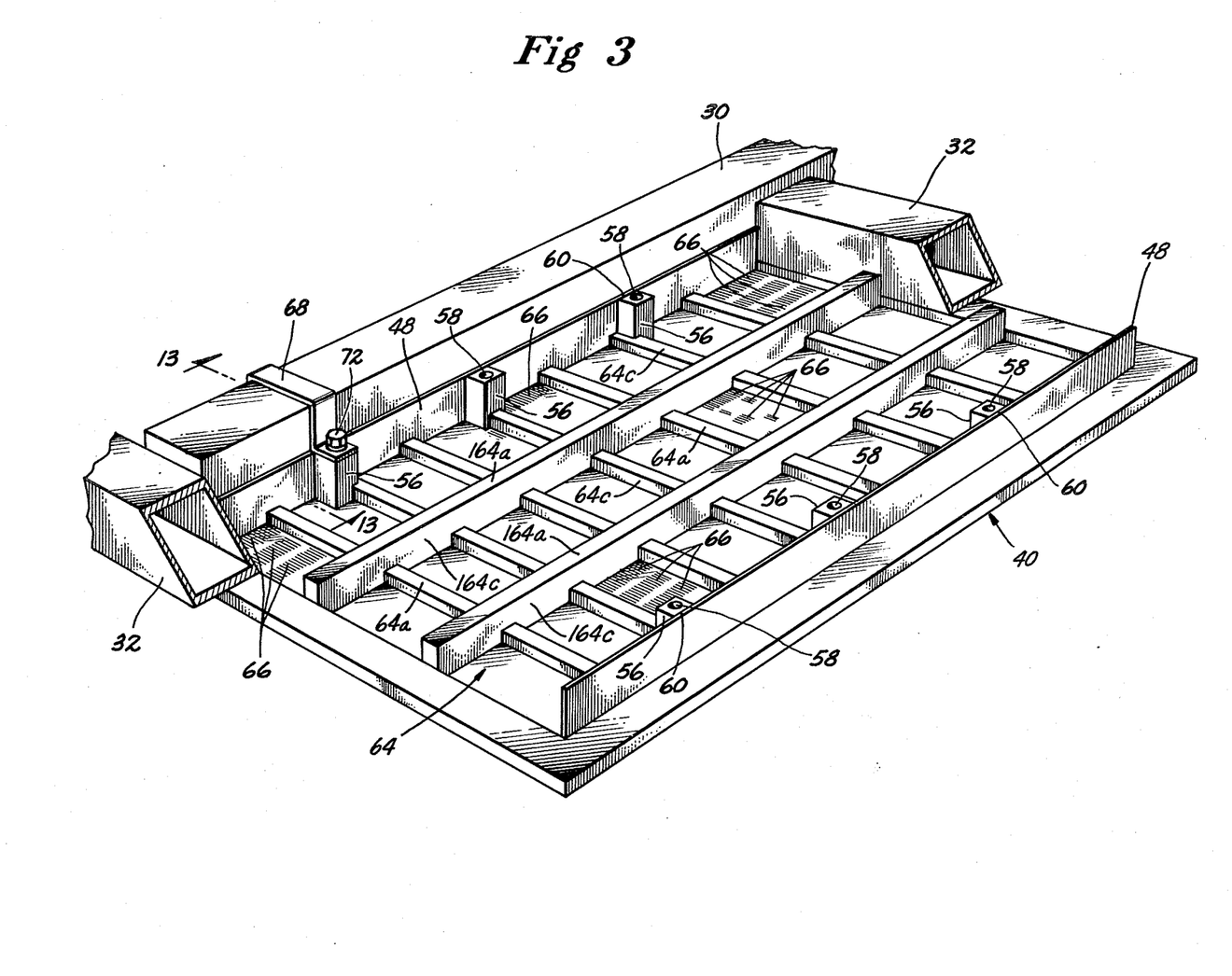
FIG. 3 is a perspective view looking downwardly at an angle toward an upper portion of the trommel for the purpose of picturing the outer surface of one of the screen units that has rotated into an uppermost position and its relationship to structural parts of the trommel.
Figure 4:
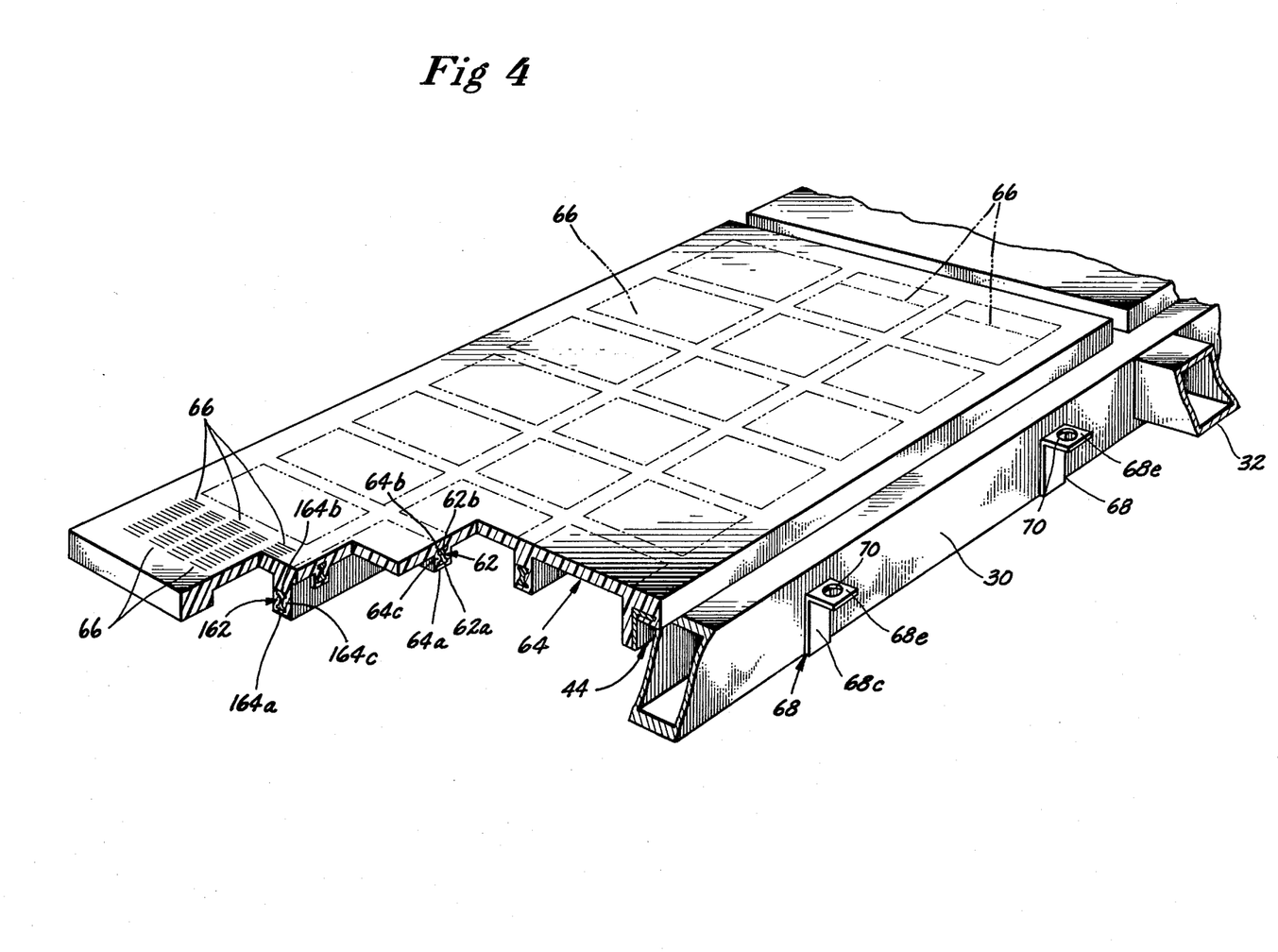
FIG. 4 is a perspective view taken at the same angle as in FIG. 3, but depicting the inner surface of one of the screen units that has rotated into a lowermost position, structural parts of the trommel again being shown but as seen from within the trommel.

As best understood from FIGS. 3 and 4, the skeletal framework of the trommel 10 is comprised of intersecting box beams and cross beams 30 and 32 respectively. Although some trommels are conical, it will be appreciated that the interconnected beams 30, 32 provide a cylindrical construction as far as the exemplary trommel 10 is concerned.

Figures 2, 13:
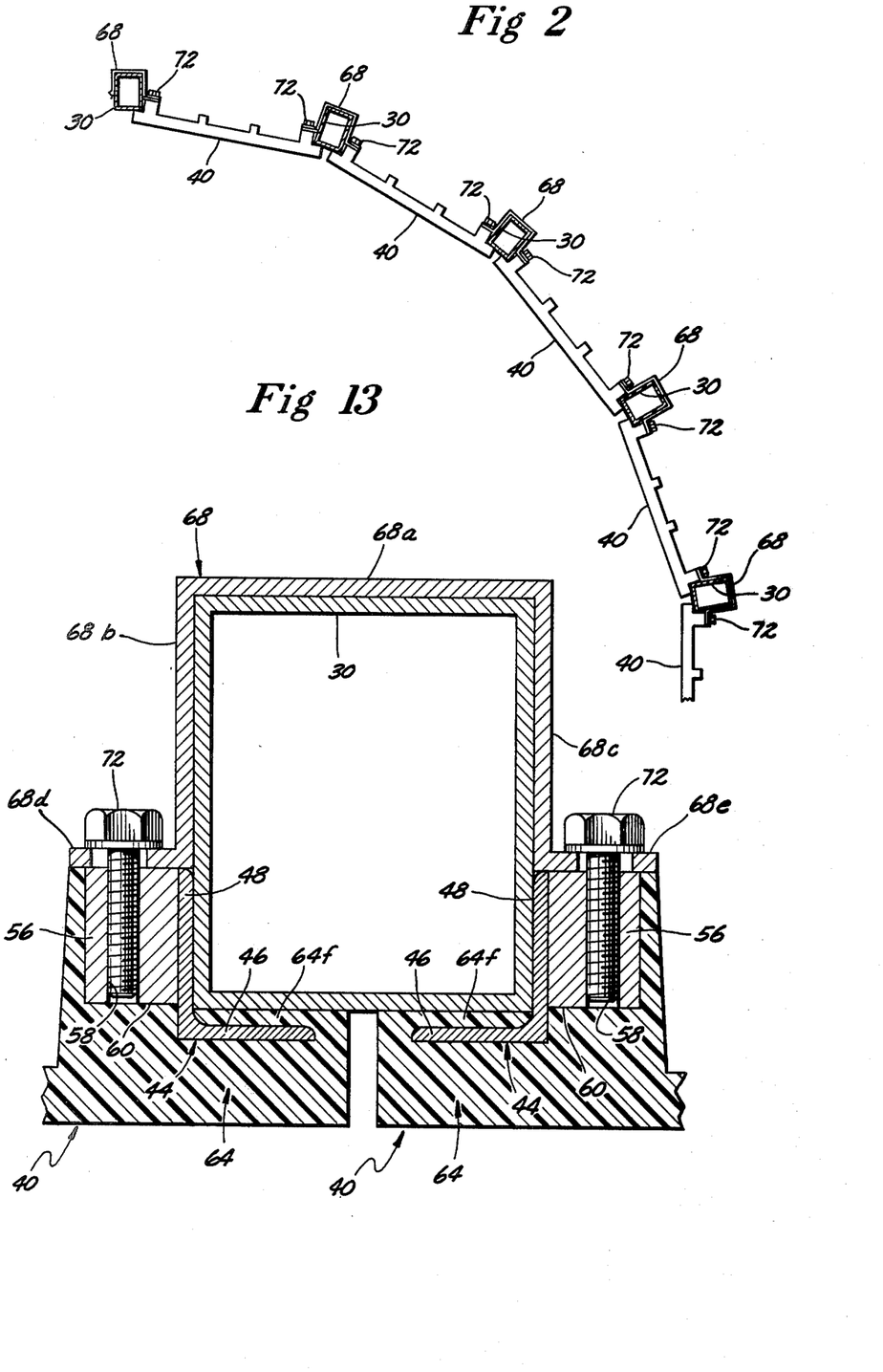
FIG. 2 is an enlarged quarter sectional view taken in the direction of line 2—2 of FIG. 1 for the purpose of diagrammatically showing several screen units and generally the manner in which they are held in place.
FIG. 13 is an enlarged sectional view in the direction of line 13—13 of FIG. 3 for the purpose of showing to better advantage the manner in which the side portions of two adjacent screen units are anchored to a box beam of the trommel.

In the depicted trommel 10, there are three screen groups 34a, 34b and 34c, each group having an annular or cylindrical configuration and the three groups collectively constituting the trommel 10. It will be appreciated that the material introduced into the trommel 10 from the grinding mill 8 is sifted outwardly through the screen groups 34a, 34b and 34c as the trommel 10 is rotated by the drive motor 18. What does not pass through the screen groups or sections 34a, 34b and 34c is returned to the mill 8 after traversing the entire length of the trommel 10.

Each screen group or section 34a, 34b and 34c is composed of a preferred number of screen units 40. The number, quite obviously, depends upon the diameter of the trommel as well as the size of the individual screen units. Our invention is concerned with the specific construction of the identical screen units 40 and one such screen unit 40 will now be described in detail.

Figure 5:
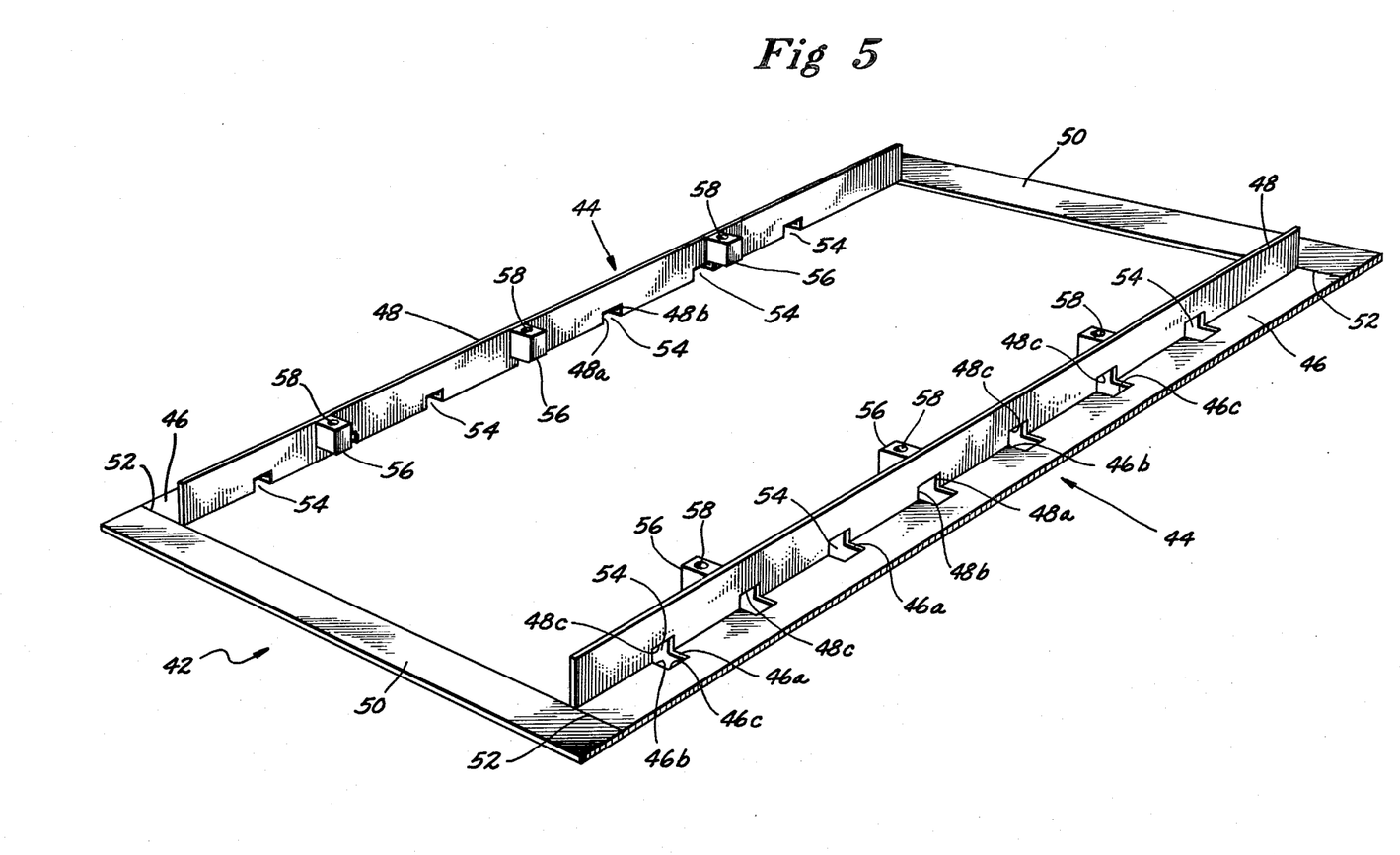
FIG. 5 is a perspective view of the steel frame contained within each screen unit, the frame being on a larger scale but spatially oriented as in FIG. 3.

Referring to FIG. 5, a rectangular steel frame denoted generally by the reference numeral 42 has been illustrated. The frame 42 includes elongated brackets 44 at the sides thereof, each bracket 44 having an angled cross section providing a horizontal flange 46 and a vertical flange 48 in FIG. 5. The frame 42 further includes a flat strip 50 at each end, the strips 50 and the flanges 46 being welded at 52.

Figures 7, 10:
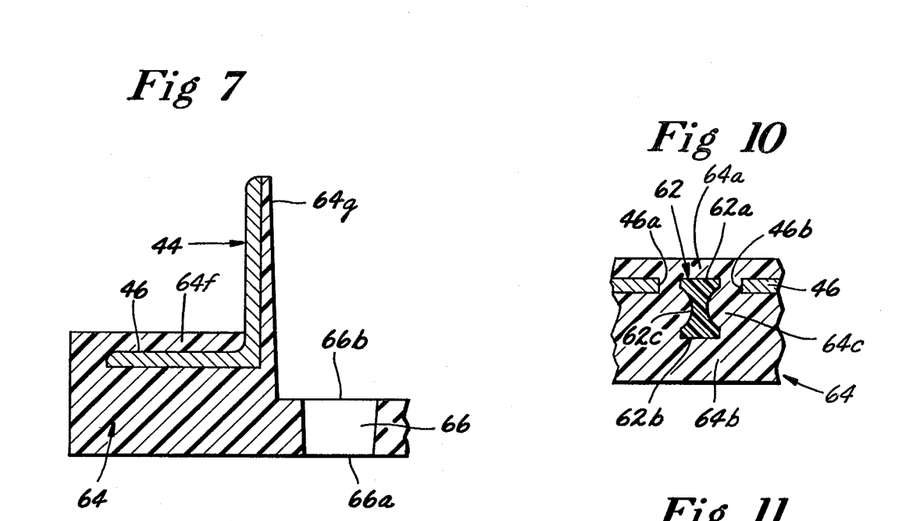
FIG. 7 is a sectional detail taken in the direction of line 7—7 of FIG. 6 for the purpose of illustrating how one side portion of the steel frame is encased in polyurethane.
FIG. 10 is a sectional detail taken in the direction of line 10—10 of FIG. 9, the view further showing how the end of the fiberglass rod appearing at the left in FIG. 9 is received in the notch with which it is associated.
Figure 9:
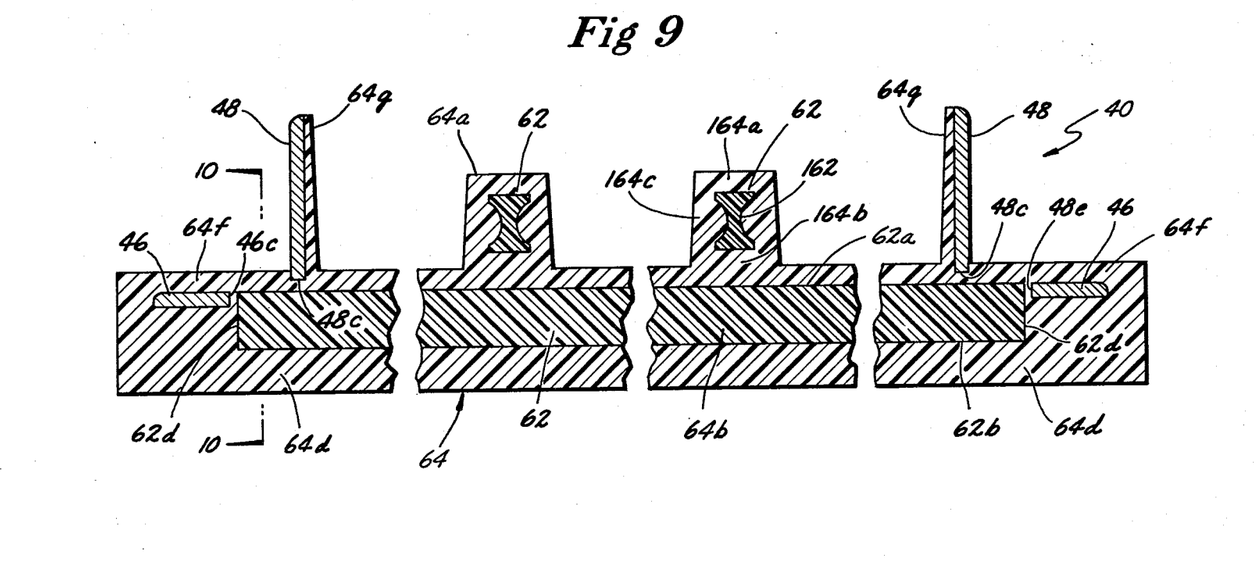
FIG. 9 is a transverse sectional view taken in the direction of line 9—9 of FIG. 6 for the purpose of showing how the opposite ends of one fiberglass rod are received in notches formed in the sides of the frame, portions of the polyurethane panel having been removed in order to permit a larger scale to be utilized.

It is important to note that the brackets 44 have a number of notches 54 cut therein, as can be perceived in FIG. 5. It will be helpful in examining and understanding some of the sectional views, namely FIGS. 9 and 10, to label the edges of the flanges 46 and 48 forming these notches 54. Accordingly, the edges belonging to the flanges 46 have been identified as 46a, 46b and 46c, whereas the edges belonging to the flanges 48 have been given the numbers 48a, 48b and 48c. Stated somewhat differently, each notch 54 is comprised of a rectangular notch defined by the edges 48a, 48b and 48c.

Figure 11:
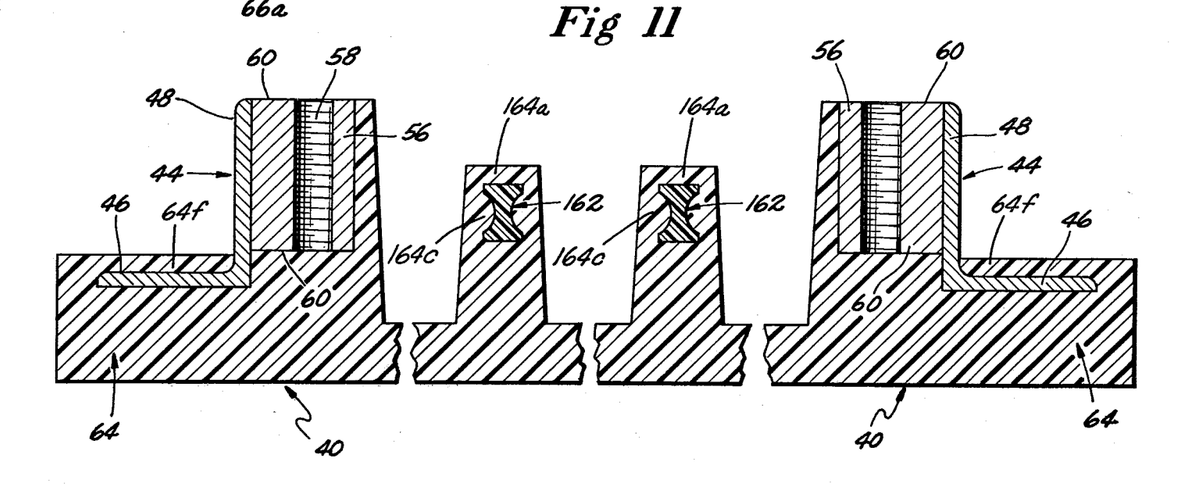
FIG. 11 is a sectional detail taken in the direction of line 11—11 of FIG. 6 with portions of the panel having been removed in order to permit a larger scale to be employed, the view showing two of the sleeves used in holding the screen unit in place.

Enabling the screen unit 40 in each case to be anchored in place are a number (actually three per bracket 44) of steel blocks 56, each block having an offset tapped hole 58 therein. As can be seen from FIGS. 11 and 13, one face of each block 56 is welded to one side of the flange 48 at 60.

Figure 6:
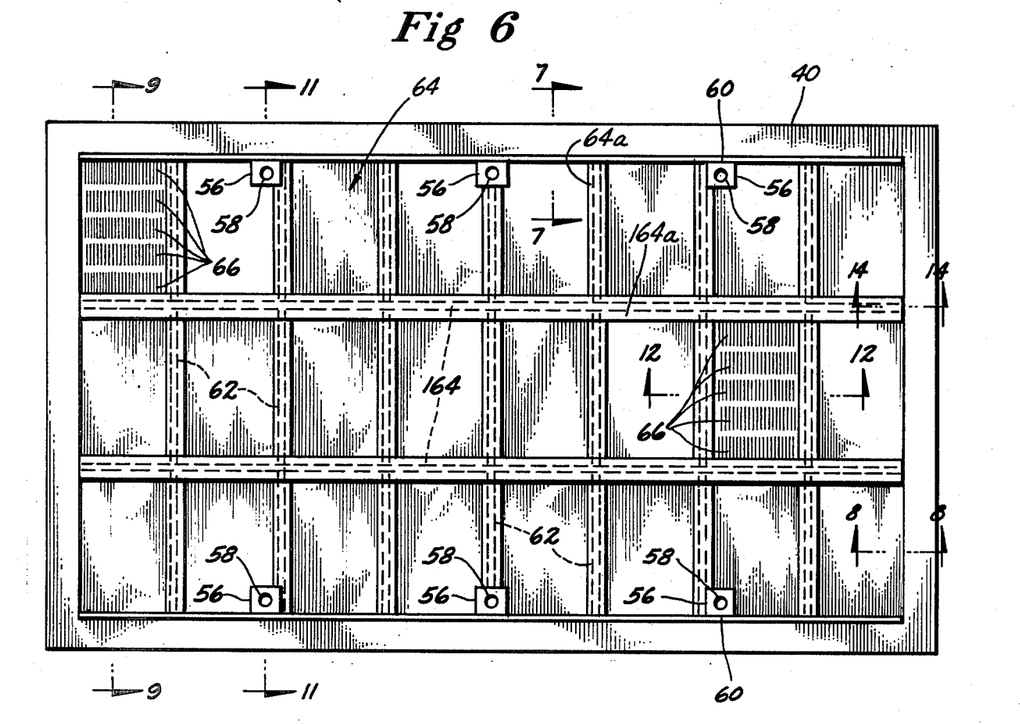
FIG. 6 is a top plan view of a screen unit corresponding to FIG. 3, the view also being on an enlarged scale but omitting the trommel parts of FIG. 3.
Figure 12:
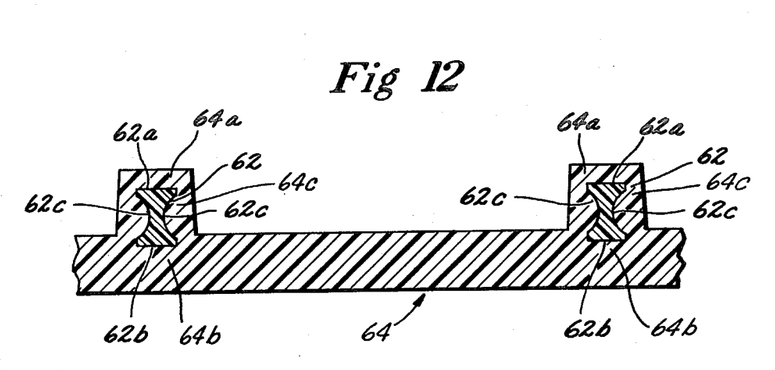
FIG. 12 is a sectional view taken in the direction of line 12—12 of FIG. 6.

At this time, attention is called to a number of transverse reinforced polyester or fiberglass rods 62. Each rod 62 has what might best be termed a modified I-beam appearance as far as its cross section is concerned. More specifically, the rods 62, as viewed in FIG. 12, have a flat top 62a, a flat bottom 62b and inwardly curved sides 62c. From FIG. 9, it can be seen that the rod 62 also has flat ends 62d. Owing to the fact that the rods 62 are relatively slender, they can flex somewhat under load, as will become clearer hereinafter. The rod 62 in each instance is of sufficient length so as to span the lateral distance between the two steel brackets 44. It will be appreciated that the fiberglass rods 62, as indicated in phantom outline in FIG. 6, are spaced from each other in a parallel relationship, actually being perpendicular to the brackets 44. More specifically, during the fabrication of a screen unit 40, the opposite ends 62d are placed in the rectangular notches 54 in a spaced relation with the edges 46a, 46b and 46c, as well as with respect to the edges 50a, 50b and 50c (See FIGS. 9 and 10).

A screen panel 64 of elastomeric material, more specifically polyurethane, encompasses the various rods 62. In this regard, the rods 62 are molded into the polyurethane so that a strip or portion of the screen panel 64, which has been labeled 64a, extends above the plane containing the flat tops 62a of the rods 62. As can be appreciated from FIG. 12, the bottom 62b of the rods 62 has a layer or portion 64b of polyurethane therebeneath. Also, from FIG. 12 it can be appreciated that portions 64c of polyurethane flank each inwardly curved rod side 62c. Still further, as better understood from FIG. 9, a section of polyurethane 64d encompasses the portion of the rod at each end 62d. Since the ends 62d of the rods 62 are spaced from the edges 46a, 46b, 46c, 50a, 50b and 50c, the section of polyurethane labeled 64d completely encircles the rod portion adjacent each end 62d, as is believed evident from FIGS. 9 and 10. Still additional sections 64f of polyurethane envelope the flanges 46 of the brackets 44 and a layer 64g confronts one side of each vertical flange 48. Consequently, it is to be appreciated that the polyurethane for all intents and purposes envelopes the steel frame 42 and the transverse plastic rods 62, being bonded thereto during the casting process used in fabricating each screen unit 40.

Whereas in practice there are seven transverse fiberglass rods 62 embedded in the polyurethane panel 64 of each screen unit 40, there are two additional fiberglass rods 162 which extend longitudinally or perpendicularly to the transverse rods 62. Other than being longer than the rods 62, the rods 162 are identical to the rods 62 and, therefore, their cross sections need not be described with any degree of particularlity. It should be pointed out, however, that the longitudinal rods 162 are completely encased with polyurethane which material is integral with the panel 64. To assist in appreciating the encasement that has just been alluded to, the portions of the panel 64 which completely contain the longitudinal rods 162 therein have been denoted by the numerals 164a.

Figure 14:
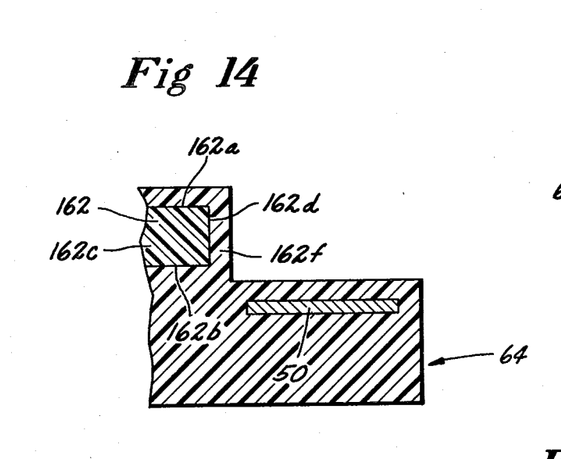
FIG. 14 is a sectional view taken in the direction of line 14—14 of FIG. 6 for the purpose of depicting one end of one longitudinal rod and its relation with the same end portion of the frame as shown in FIG. 8.

From FIG. 14 it can be discerned that the end 162d of the rod 162, as well as its opposite end (and also the two ends of the second longitudinal rod 162) does not extend into any notch, such as a notch which would correspond to one of the previously mentioned notches 54 for the transverse rods 62. However, the end 162d is confronted with a wall or layer 164d of polyurethane. The longitudinal rods 162, being disposed circumferentially or radially outwardly with respect to the transverse rods 62, provide added support for the transverse rods 62 when they flex radially outwardly, thereby minimizing the likelihood of the polyurethane tearing, even under the most severe loads.

Figure 8:
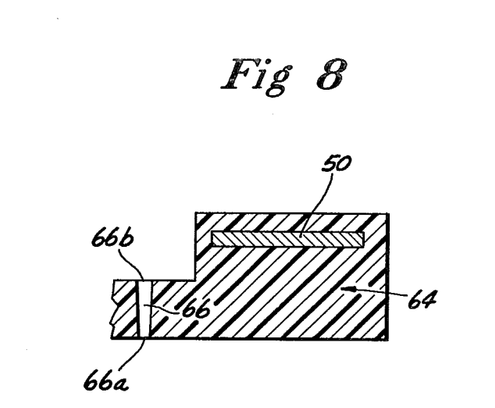
FIG. 8 is a sectional view taken in the direction on line 8—8 of FIG. 6 for the purpose of illustrating how one end portion of the frame is encased in polyurethane.

As its name implies, the function of the panel 66 is to screen out the finer particles from the coarser ones. Therefore, the panel 64 is formed with a multiplicity of elongated holes or slots 66, the holes 66 being grouped between the rods 62 and 162, as can be understood from FIG. 6. As will be perceived from FIGS. 7 and 8, the holes 66 are tapered. More specifically, it should be noted that the taper is such that the holes are smaller toward the interior of the trommel 10, as indicated by the numeral 66a, and larger on the outside of the trommel 10, as denoted by the numeral 66b. In this way, small rocks or stones cannot become wedged into the holes 66, for if the rod or stone is small enough to enter the smaller end 66a of any hole, it will pass on through, for the hole 66 becomes larger toward its outer end 66b.

In order to hold the various screen units 40 in place, hold-down clips or straps 68 are employed. As best understood from FIGS. 3 and 13 (as well as FIG. 4), each clip 68 includes a bridging portion or bight 68a, and legs or sides 68b, 68c which with the bight 68a form a "U". The legs 68b and 68c have outwardly directed feet 68d and 68e thereon. Each foot 68d and 68e has a hole 70 therein, the hole 70 being somewhat larger than the tapped holes 58 in the previously mentioned blocks 56 to allow the insertion of a bolt 72 through the hole 70 even though it is not truly centered with a tapped hole 58 which is to threadedly receive the threaded shank of the bolt 72. In this way, when a clip 68 is placed over a box beam 30, as can be readily noted from FIG. 13, the marginal portions of adjacent screen units 40 can be anchored in place, tightening of the bolts 72 pulling the brackets 44, more specifically their flanges 46, in the direction of the side of the beam 30 opposite the side that the bight 66a confronts, thereby compressing that portion 64f of the polyurethane therebetween against the beam 30. It should be appreciated that the ends 62d of the rods 62 overlie marginal portions of the beams 30, and while not anchored or fastened thereto, nonetheless receive support thereform in a radial outward direction.

Accordingly, each screen unit 40 is securely held in place on the trommel 10, yet can readily be taken off if circumstances require its replacement. All that need be done is to loosen the bolts 72 at each side of the particular screen unit 40 to be removed, which is done from the outside of the trommel 10. The unit 40 thus released can then be skewed or angled sufficiently so that it can be withdrawn through the opening between adjacent pairs of box beams 30 and cross beams 32.

During operation, however, the particulate material to be separated is jostled within the trommel 10. The mass of such material exerts an outward, mainly downward, force, tending to bulge outwardly the elastomeric or polyurethane panels 64. However, the presence of the polyester rods 62 and 162 effectively resist such bulging because of the flexing that occurs. In this regard, it is to be appreciated that the opposite ends 62d of the various rods 62 are not fastened to the frame 42, being only loosely received in the notches 54 thereof, yet supported against outward displacement by the trommel beams 30. The containing of the rod portions adjacent the ends 62d completely in polyurethane permits any needed movement or shifting of the ends 62d within the notches 54 as the rods 62 bow or arc, yet outward movement, as already explained, is resisted by the beams 30 belonging to the frame structure of the trommel 10. In this regard, it is believed readily understandable that the ends 62d move toward each other under load, yet return to their normal distance apart when the load is removed. The present invention thus readily accommodates the foregoing shifting of the ends, but at the same time enables the transverse rods 62, assisted by the longitudinal rods 162, to reinforce the screen panels 64 to such a degree that no damage occurs during normal operation.

The flexing of the rods 62 and 162 has been mentioned above. What might not be appreciated, however, is that the polyurethane, being an elastomer, constituting the screen panel 64 constantly stretches when lowermost, as in FIG. 4, and contracts when uppermost, as in FIG. 3. Such action concomitantly enlarges the holes 66 as that particular unit 40 moves toward the bottom (the load increasing) and allows the holes 66 to return to their normal size as the unit 40 rotates upwardly (the load decreasing). This repeated distention and constriction of the hole size causes a self-cleaning action which keeps the holes 66 free and unclogged. In the past it has been customary to water flush trommels as their screens pass the 12 o'clock or uppermost position; such is not necessary when practicing our invention.

We claim:

1. A screen unit comprising a screen panel of elastomeric material, rigid means extending along opposite sides of said screen panel, and a plurality of plastic reinforcing rods contained in spaced portions of said panel and having therein portions overlying portions of said rigid means toward one side of said panel and free to move relative to said rigid means when said rods are flexed by material engaging said one side of the panel.

2. A screen unit in accordance with claim 1 in which said reinforcing rods include a first group of rods extending transversely across said screen panel and a second group of rods extending longitudinally relative said screen panel.

3. A screen unit in accordance with claim 2 in which said transversely extending and longitudinally extending rods have elastomeric material therebetween.

4. A screen unit in accordance with claim 1 in which said elastomeric material is polyurethane.

5. A screen unit in accordance with claim 3 in which said plastic material is reinforced polyester.

6. A screen unit in accordance with claim 5 in which said rods have generally flat tops and bottoms and inwardly curving sides.

7. A screen unit in accordance with claim 5 in which said rigid means includes a pair of elongated metal brackets extending along opposite edges of said screen panel, each bracket being provided with longitudinally spaced notches and the ends of said rods being received in said notches, said notches forming said portions which said end portions of said rods overlie.

8. A screen unit in accordance with claim 7 in which said rods are narrower than the width of said notches, a portion of said polyurethane occupying the space between the sides of said rods and the edges of the notches in which the rod end portions are received, whereby said end portions of said rods are free to move relative to said brackets when said rods are flexed.

9. A screen unit in accordance with claim 8 in which the rod end portions terminate in a spaced relation with the closed ends of said notches, there being polyurethane between the received ends of said rods and the closed ends of said notches, said spaced relation with the closed ends of said notches also helping to permit the end portions of said rods to move freely relative to said brackets.

10. A screen unit in accordance with claim 9 in which said brackets have an angled cross section.

11. A screen unit in accordance with claim 10 in which said polyurethane completely encases said rods and brackets.

12. A screen unit in accordance with claim 11 in which the angled cross section of said brackets form a first flange residing in the general plane of said panel and a second flange extending perpendicularly from one side thereof.

13. A screen unit in accordance with claim 12 including a plurality of spaced blocks secured to said second flanges.

14. A screen unit in accordance with claim 13 in which said blocks each have a tapped hole for use in mounting said screen unit in a trommel.

15. A screen unit in accordance with claim 12 including a flat metal strip at each end of said elongated brackets, end portions of said strips being secured to the ends of said first flanges.

16. A screen unit in accordance with claim 15 including a second plurality of rods extending at right angles with respect to said first plurality of rods, said second plurality of rods being similarly configured to said first plurality of rods and said second plurality of rods having spaced intersections with respect to said first plurality of rods and a length less than the distance between said strips.

17. A screen unit in accordance with claim 16 in which each of said rods has generally flat parallel faces and inwardly curved sides.

18. A screen unit in accordance with claim 17 in which one flat face of each of said rods contained in said first plurality of rods resides in substantially the same plane as said horizontal flanges and the other of said flat faces of each of said rods contained in said first plurality of rods is in a plane nearer said second plurality of rods.

19. In a rotating trommel including intersecting beams forming generally rectangular openings therebetween, a screen unit for each of said openings having an inwardly directed surface against which material to be sifted contacts as said trommel rotates, each screen unit comprising a screen panel of elastomeric material, a frame including a rigid longitudinal bracket extending along each side of said panel and a transverse member extending across each end, a plurality of resilient reinforcing rods extending between said brackets, the end portions of said rods overlying inwardly directed portions of said rigid brackets, and means for clamping said brackets to a pair of said beams to hold the screen unit in place in said trommel.

20. A trommel in accordance with claim 19 in which said brackets have an angular cross section providing first and second flanges, said first flange being in the plane of said screen panel and said second flange extending perpendicularly from said first flange at a location spaced inwardly from one side edge of said screen unit, said clamping means including a plurality of longitudinally spaced members secured to said second flange, each member having a tapped hole therein, said clamping means also including a plurality of U-shaped strips with apertured feet thereon, and a bolt for each foot insertable through the aperture thereon and engageable in a tapped hole to hold each U-shaped strip against one side of a beam and to pull the first flange of each bracket toward the opposite side of the said beam, whereby each screen unit is firmly held in each of said openings.

21. A trommel in accordance with claim 20 in which said first and second flanges have notches at spaced locations therealong, an end portion of each rod being received in a notch of said first flange and a notch of said second flange, the notches in said second flanges providing said inwardly directed portions.

22. A trommel in accordance with claim 21 in which said elastomeric material is polyurethane and said rods are of reinforced polyester, said polyurethane encasing said rods and said brackets.

23. A trommel in accordance with claim 22 including a second plurality of reinforcing rods extending parallel to said brackets and being located outwardly of said first plurality of rods, said polyurethane also encasing said second plurality of rods.

* * * * *